United States Patent
Cavanaugh et al.

[11] 3,882,093
[45] May 6, 1975

[54] SULFONYL-CONTAINING FLUOROCARBON VINYL ETHERS AND ION EXCHANGE MEMBRANE FORMED THEREFROM

[75] Inventors: Robert John Cavanaugh; William H. Calkins, both of Wilmington, Del.

[73] Assignee: E. I. du Pont de Nemours & Company, Wilmington, Del.

[22] Filed: Jan. 2, 1974

[21] Appl. No.: 430,050

[52] U.S. Cl....260/79.3 MU; 260/614 F; 260/615 BF
[51] Int. Cl.... C07c 143/68; C07c 143/70; C08f 15/02
[58] Field of Search... 260/79.3 MU, 614 F, 615 BF

[56] References Cited
UNITED STATES PATENTS

| | | | |
|---|---|---|---|
| 3,041,317 | 6/1962 | Gibbs et al. | 260/79.3 MU |
| 3,282,875 | 11/1966 | Connolly et al. | 260/79.3 MU |
| 3,310,606 | 3/1967 | Fritz | 260/80.3 E |
| 3,397,191 | 8/1968 | Beckerbauer | 260/80.3 E |
| 3,492,277 | 1/1970 | Clark | 260/79.3 MU |
| 3,718,627 | 2/1973 | Grot | 260/79.3 MU |
| 3,784,399 | 1/1974 | Grot | 260/79.3 MU |

FOREIGN PATENTS OR APPLICATIONS

| | | | |
|---|---|---|---|
| 1,034,197 | 6/1966 | United Kingdom | 260/79.3 MU |

*Primary Examiner*—Ronald W. Griffin

[57] ABSTRACT

Sulfonyl-containing fluorocarbon vinyl ethers are disclosed of the formula

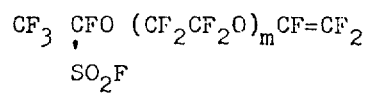

and

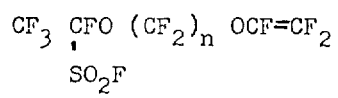

wherein m is an integer from 2 to 5 and n is an integer from 2 to 10.

The sulfonyl-containing fluorocarbon vinyl ethers are prepared by monoaddition of sulfuryl fluoride to divinyl ethers in the presence of fluoride ions with the formed ethers useful in preparation of ion exchange polymers.

2 Claims, No Drawings

SULFONYL-CONTAINING FLUOROCARBON VINYL ETHERS AND ION EXCHANGE MEMBRANE FORMED THEREFROM

BACKGROUND OF THE INVENTION

Sulfonyl-containing fluorocarbon vinyl ethers are known in the art with the sulfonyl group on a primary carbon atom. These compounds disclosed in Connolly and Gresham U.S. Pat. No. 3,282,875 are of the formula $$FSO_2CF_2CF_2O(CF_2CF_2O)_nCF=CF$$

wherein n is an integer from 1 to 10. Polymers prepared from these ethers are useful in preparation of polymers for ion exchange purposes.

A disclosure of the addition of sulfuryl fluoride to a perfluoro (alkyl vinyl ether) is set forth in J. Org. Chem, 33, 344 (1968).

SUMMARY OF THE INVENTION

The present invention relates to the formation of sulfonyl-containing fluorocarbon vinyl ethers of the formula (I) $CF_3\underset{SO_2F}{\overset{|}{C}FO}(CF_2CF_2O)_m CF=CF_2$ and (II) $CF_3\underset{SO_2F}{\overset{|}{C}FO}(CF_2)_n OCF=CF_2$ wherein m is an integer from 2 to 5 and n is an integer from 2 to 10. Preferred values for m are 2 and 3 and for n are 2 to 4.

These compounds are formed by monoaddition of sulfuryl fluoride to fluorocarbon divinyl ethers with utility of the compounds in formation of highly stable polymers which possess ion exchange properties.

DETAILED DESCRIPTION OF THE INVENTION

In addition to sulfuryl fluoride and a source of fluoride ions, the starting material for the preparation of the sulfonyl-containing fluorocarbon ethers are set forth in either Beckerbauer U.S. Pat. No. 3,397,191 or Fritz U.S. Pat. No. 3,310,606. These compounds are divinyl ethers of the formula (III) $CF_2=CFO(CF_2CF_2O)_m CF=CF_2$ and (IV) $CF_2=CFO(CF_2)_n OCF=CF_2$ wherein m is an integer from 2 to 5 and n is an integer from 2 to 10.

Preferred integer values for m are 2 and 3 and n are 2 to 4.

Although the addition of sulfuryl fluoride to vinyl ether is known as is disclosed in J. Org. Chem., 33, 344 (1968), the selective monoaddition of sulfuryl fluoride to a divinyl ether has not been disclosed.

For optimum conversion and to avoid undesirable by-products, the reaction is desirably undertaken with nearly equimolar amounts of the divinyl ether and sulfuryl fluoride. However, it is within the scope of this disclosure that an excess of one of the components be employed. Generally the excess will be limited to 50 to 300 mole percent which will ordinarily be the divinyl ether.

In the reaction procedure fluoride ions are necessary and suitable sources include such as cesium fluoride and tetraethyl ammonium fluoride. The concentration of fluoride ion may be varied within wide limited as for example between 3 percent and 100 percent based upon divinyl ether. A preferred example is of the order of 10 percent.

Desirably a solvent will be employed and suitable examples include tetraglyme and acetonitrile.

The temperature at which the reaction is undertaken is not considered critical. Illustratively elevated temperatures of the order of 40° to 100°C. and more preferably 60° to 70°C. may be used.

Generally elevated pressure will be employed and illustratively pressures of the order of 200 to 800 psig are satisfactory.

The sulfonyl-containing fluorocarbon vinyl ethers of Formula (I) and Formula (II) may be readily homopolymerized and copolymerized by conventional techniques in the art. Illustratively the disclosure set forth in Connolly and Gresham U.S. Pat. No. 3,282,875 may be used in the polymerization process.

The vinyl compounds of the disclosure may be polymerized using a perfluorocarbon solvent which is inert to free radicals and a perfluorinated free radical initiator. Suitable fluorinated solvents include fluoroheptane, perfluorodimethylcyclohexane and perfluorodimethylcyclobutane and perfluorobenzene and trifluorotrichloroethane. Examples of suitable initiators include a perfluorocarbon peroxide or an azo compound.

The polymerization pressure and temperature are not considered critical. Illustratively the polymerization temperature will vary from −80° to 200°C. depending upon the initiator employed. Pressure will be generally employed to control the ratio of any gaseous monomer or comonomer and illustratively pressures in the range of 1 to 200 atmospheres can be used.

Copolymerizable monomers which may be employed in forming the copolymer include copolymerizable fluorinated ethylenes in which the vinyl group is at least di-substituted with fluorine atoms vinylidene fluoride, chlorotrifluoroethylene, tetrafluoroethylene and hexafluoropropylene. Additional comonomers may be present, desirably in small amounts, such as of the order of up to about 6 mole percent thereof in the resultant polymer such as perfluoro (alkyl vinyl ethers) wherein the alkyl group contains 1 to 6 carbon atoms.

In a resulting copolymer it is most desirable that the polymer contain at least 0.5 mole percent of the repeating unit:

(III) $CF_3\underset{SO_2F}{\overset{|}{C}FO}(CF_2CF_2O)_m\underset{CF_2}{\overset{|}{C}F}$ or (IV) $CF_3\underset{SO_2F}{\overset{|}{C}FO}(CF_2)_n\underset{CF_2}{\overset{|}{O}CF}$ wherein m and n have been previously defined.

For the polymerization process suitable non-aqueous techniques may be employed and Gibbs and Griffin U.S. Pat. No. 3,041,317, Brubaker U.S. Pat. No. 2,393,967, Berry U.S. Pat. No. 2,559,752 and Lontz U.S. Pat. No. 2,593,583 disclose illustrative polymerization procedures.

The polymers of Formula III and IV are in non-ionic form since the sulfonyl groups are present as $-SO_2F$. Therefore it is desirable to convert the polymer to ionic form for utility for ion exchange purposes.

The conversion to the final polymer may be undertaken in accordance with the disclosure in Connolly et al. U.S. Pat. No. 3,282,875.

For ion exchange purposes of the polymer, conversion is undertaken with conversion of at least a portion and preferably at least a majority of the sulfonyl groups in the $-SO_2F$ form to $-(SO_2NH)_rQ$ wherein Q is H, cation of an alkali metal, cation of an alkaline earth metal or combination thereof and r is the valence of Q. Alternatively the sulfonyl groups in the $-SO_2F$ form may be converted to the $-(SO_3)_sMe$ form wherein Me is a H, $NH_4$ or metallic cation. Preferred definitions of Q and Me are sodium and potassium.

Conversion of the sulfonyl groups from the nonionic $-SO_2F$ form in the polymer to the ionic $-(SO_2NH)_rQ$ or $-(SO_3)_sMe$ form involves conventional reaction procedures including contact with anhydrous or hydrous ammonia and by contact with a metal hydroxide.

Illustratively a procedure of conversion of the sulfonyl groups of the polymer to ionic form, the polymer is contacted with anhydrous ammonia which can be in the gaseous form or the liquid form. After such conversion Q will be H which can be further converted to Q as a cation of an alkali metal or cation of an alkaline earth metal. The polymer is contacted with the hydroxide of the cation of the alkali metal or the cation of the alkaline earth metal by conventional procedures. A preferred example of Q is sodium or potassium.

To further illustrate the innovative aspects of the present invention, the following examples are provided.

EXAMPLE 1

A 75 ml stainless steel cylinder was charged in a dry box with 29 grams of perfluoro(ethylene glycol divinyl) ether), 1.5 grams of dry cesium fluoride and 2.2 grams of tetraglyme which had been distilled from lithium aluminum hydride. The cylinder was sealed, removed from the dry box, cooled in liquid nitrogen, and evacuated. Ten grams of sulfuryl fluoride was condensed into the cylinder and the cylinder was shaken for 6 hours while being immersed in a 70°C. oil bath. The cylinder was cooled to room temperature and ca. 2 grams of gas which was mainly sulfuryl fluoride was vented. Gas chromatographic analysis showed about 10 percent recovered divinyl ether and a yield of 60 percent for perfluoro(2-fluorosulfonyl-3,6-dioxa-7-octene). Several similar runs were combined and distilled through an 18 inch spinning band column to give pure monoadduct, b.p. 72°-73°/260 mm. Hg infrared spectrum showed absorption bands at 5.48, 6.90, and 10.3 microns. Mass spectrum showed m/e peaks at 313, 263, 197, 81, 69.

EXAMPLE 2

A 75 ml stainless steel cylinder was charged with 38 grams perfluoro(2-fluorosulfonyl-3,6-dioxa-7-octene), 35 ml trifluorotrichloroethane, and 4.5 mg perfluoropropionyl peroxide and three glass beads for agitation. The cylinder was cooled, evacuated and 1.2 g tetrafluoroethylene was condensed in. The cylinder was immersed in a water bath at 50°C. and shaken for 2 hours by a wrist action shaker. Upon opening the cylinder, tetrafluoroethylene was recovered and no polymer had formed. An additional 7.5 mg perfluoropropionyl peroxide was added along with 1.2 gm tetrafluoroethylene and the cylinder was again shaken 2 hours at 50°C. The resulting polymer was filtered, washed with trifluorotrichloroethane and dried 2 hours at 130°C. under vacuum. The yield was 800 mg. A clear homogeneous film was pressed at 300°C. Analysis based upon infrared absorption showed the polymer to contain 10 percent vinyl ether by weight (equivalent weight of 3900). Differential thermal analysis showed an endotherm centered at 250°C. Thermal gravimetric analysis showed little weight loss below 375°.

EXAMPLE 3

A 30 ml stainless steel cylinder was charged with 3 4-mm glass beads, 10 ml trifluorotrichloroethane, 19 grams perfluoro(2-fluorosulfonyl-3,6-diox-7-octene) and 50 $\mu$l of a trifluorotrichloroethane containing 0.152 grams of bis(pentafluoropropionyl)peroxide per ml. of solution. The cylinder was connected to a vacuum manifold, cooled in liquid nitrogen and evacuated. 2.2 Grams tetrafluoroethylene were then condensed into the cylinder with the tetrafluoroethylene freed of inhibitor by passing the gas over silica gel prior to introduction. The cylinder was closed and placed on a wrist action shaker and the cylinder was immersed in a 50°C. water bath. The cylinder was shaken 2 hours at 50°C., cooled and opened. A polymer was obtained which was filtered, washed with 20 ml trifluorotrichloroethane and dried in a vacuum oven for 2 hours at 120°C. The yield was 1.15 g of polymer.

EXAMPLE 4

A sample of the copolymer of Example 2 was heated at 100°C. for 1 hour in a solution of 8 gm sodium hydroxide, 46 gm water and 46 grams dimethyl sulfoxide. Analysis of the infrared spectrum showed complete conversion of the sulfonyl fluoride to the sodium salt. The film was then washed with hydrochloric acid and boiled in distilled water. The resin showed a specific resistance of 340 ohm cm in 0.6 N KCl and a specific resistance of 300 ohm cm in 25 percent NaCl. Although the invention has been described by way of specific embodiments, it is not intended to be limited thereto. As will be apparent to those skilled in the art, numerous embodiments can be made without departing from the spirit of the invention or the scope of the following claims.

What is claimed is:

1. A process involving the monoaddition of sulfuryl fluoride to a divinyl ether of the formula

or

wherein m is an integer of from 2 to 5 and n is an integer from 2 to 10, comprising reaction in the presence of fluoride ions of sulfuryl fluoride with said divinyl ether present at an excess up to 300 mole percent over the stoichiometric amount needed for the monoaddition.

2. The process of claim 1 wherein the sulfuryl fluoride and said divinyl ether are initially present in the reaction in essentially equimolar amounts.

* * * * *